3,788,946
PROCESS FOR THE PREPARATION OF AMYLOSE AS THE SUBSTRATE FOR THE QUANTITATIVE ANALYSIS OF AMYLASE
Masahi Kurimoto and Mikihiko Yoshida, Okayama, Japan, assignors to Hayashibara Company, Okayama, Japan
Filed July 28, 1971, Ser. No. 166,750
Claims priority, application Japan, July 28, 1970, 45/66,003
Int. Cl. C12b 1/00
U.S. Cl. 195—31 R                                 3 Claims

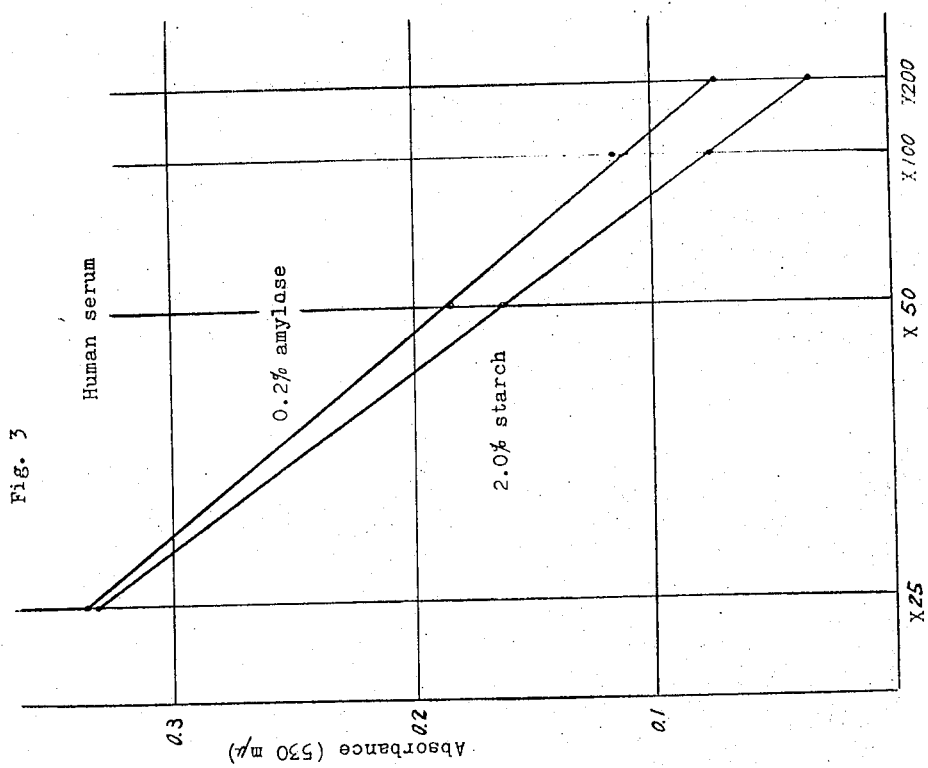
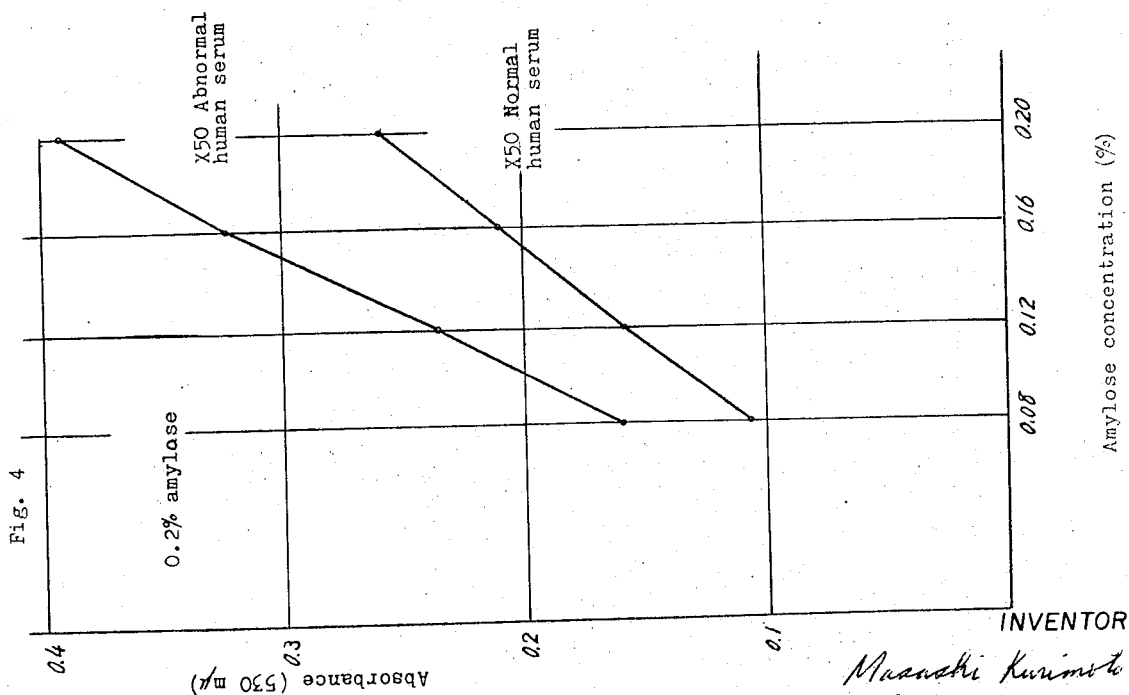

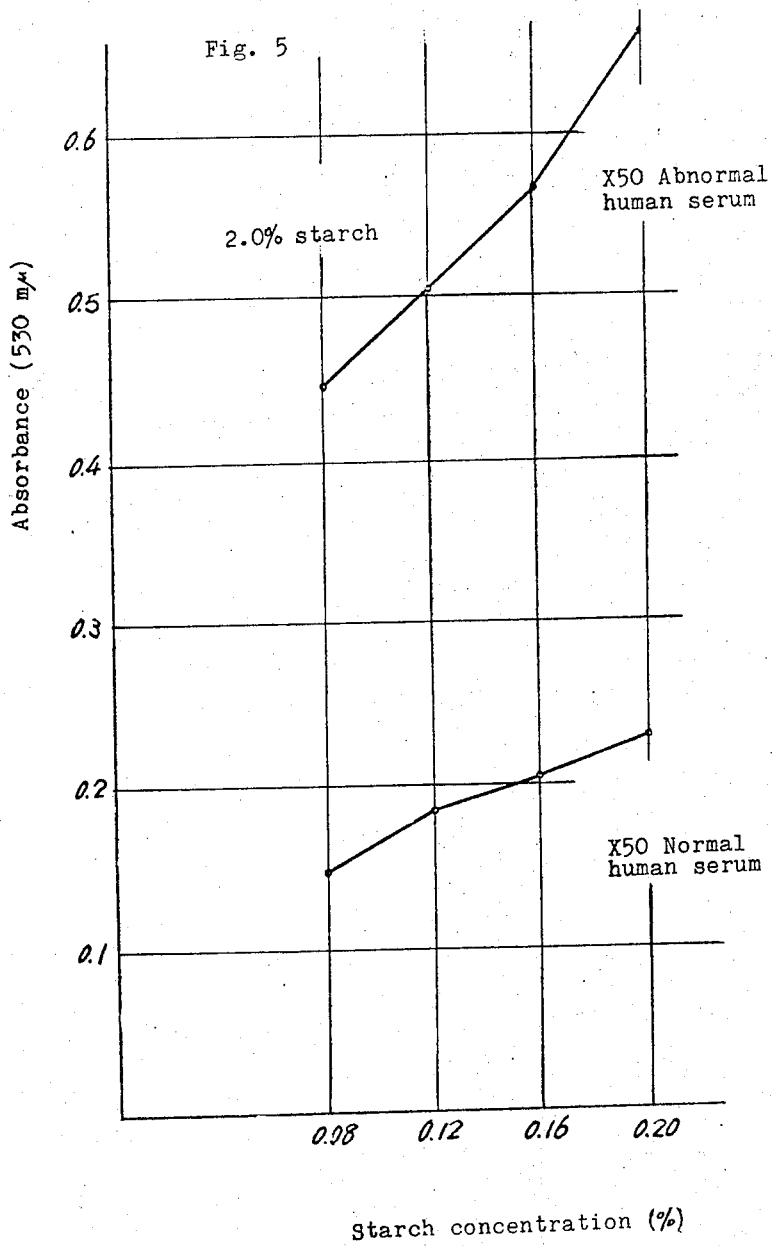

ABSTRACT OF THE DISCLOSURE

The invention deals with a method of preparation of amylose which gives an excellent substrate for the quantitative analysis of amylase, especially for that in blood serum. The outline of the preparation process is that the gelatinized starch or waxy-starch is converted into linear chain amyloses by the aid of alpha-1,6-glucosidase, and through precipitation and fractionation the linear chain amylose, which is water-soluble and very sensitive to amylase, is separated from the only slightly soluble macromolecules and oligosaccharides.

---

Figure 1:
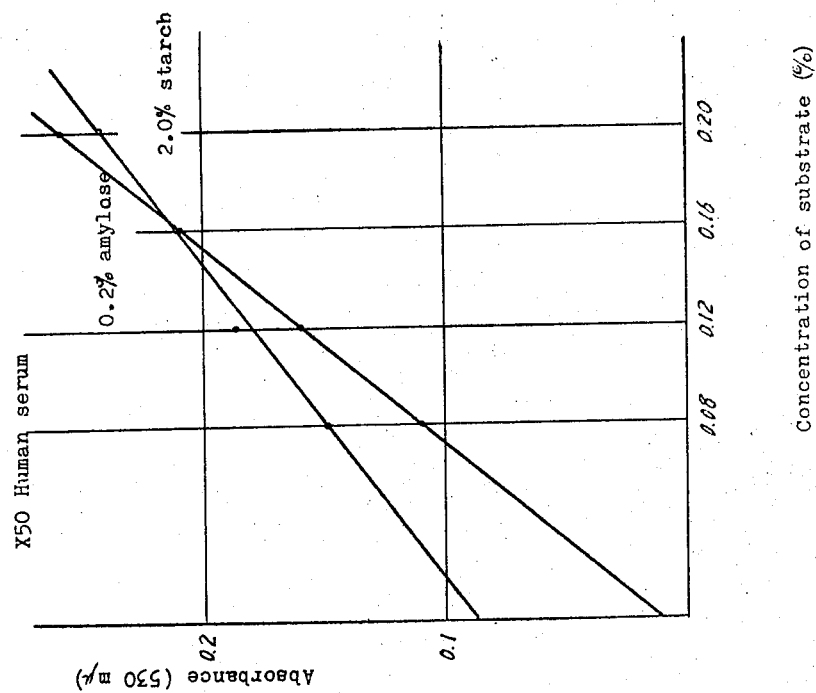

The invention deals with a method for the preparation of amylose which gives an excellent substrate for the quantitative analysis of amylase, especially for that in blood serum. The outline of the preparation process is that the gelatinized starch of waxy-starch is converted into linear chain amyloses by the aid of alpha-1,6-glucosidase, and, through precipitation and fractionation, linear chain amylose is separated from the only slightly soluble macromolecules and oligosaccharides. The obtained amylose is water-soluble, and very sensitive to amylase.

For many years, for the quantitative analysis of amylase, potato starch itself or soluble starch obtained by partial hydrolysis has been employed. The natural starch and partially hydrolized starch are used generally as 1%–2% solution which has been previously boiled to make a homogeneous solution and stored. During storage, however, the starch is often precipitated as only slightly soluble masses and become ruined. Besides these, the compositions and molecular structure of starches and partially hydrolyzed starches differ largely depending on the source, and the hydrolysis procedures employed. Such a difference in composition and structure of the substrates results inevitably in the nonuniformity in the data reported from different institutions. Actually the soluble starches are the mixture of the molecules of different molecular weights and different molecular structure, branched- and linear-chain molecules, which are different in the susceptibility to amylase from each other. This fact clearly indicates that the starch itself is inadequate as specific substrates for quantitative analysis of amylase.

This is the reason why a superior substrate for the quantitative analysis of amylase activity has been long sought in the art, especially, in the field of medical clinics where a sensitive method is required because the amount of sample for analysis is often limited and the amylase activity may be relatively low.

Recently, an improved method for amylase determination in medical clinic tests has been proposed in which a starch-dye complex is used in replacement of starch or soluble starch. But the results obtained by the method still lack uniformity and reproducibility. This method also indicated the substrate to be inadequate.

In order to meet the above requirements the inventors tried to obtain amylose which is relatively uniform in chain length and structure, easily soluble in water and shows a definite sensitivity against amylase activity. Eventually, the inventors obtained an ideal substrate suitable for clinical tests of amylase activity. In the following the method for preparation is described in detail.

The ordinary starch which contains long single chain amylose and 80% which is branched, is debranched and converted into short chain amylose with a D.P. about 20 molecules in one chain, by treating with alpha-1,6-glucosidase, such as isoamylase from a group of Pseudomonas (ATCC 21216), or pullulanase from Lactobacillus (ATCC 8724). By allowing the reaction mixture to incubate at 40° C.–50° C. for 1–3 hours for example, the low-molecular amylose can be obtained as the supernatant of the solution. The amylose is purified by repeating crystallization and dissolution. The obtained low molecular amylose is highly soluble in water giving a stable solution, sensitive to amylase and proved to be most suitable as substrates of alpha-amylases and glucoamylase, which hydrolyse the $\alpha$-1,4-glucosidic linkage.

Among the sources of the starch tested to be used as materials, starches from rice (glutinous rice) and waxy corn starch proved to be suitable ones, both of which are composed exclusively of amylopectin and scarce in natural amylose which is contained in 20%–25% in ordinary starch.

The starch is dissolved in water at a concentration of 10%–20%, heated at 135° C.–170° C. by stirring to give a homogeneous gelatinized starch paste, cooled rapidly to 50° C.–60° C., and then pullulanase or isoamylase is added prior to the retrogradation of the gelatinized starch, and the mixture stirred to promote the hydrolyzation uniformly. Among the enzymes to be used for hydrolysis the one from Psedomonas (ATCC 21216) proved to be most suitable for the present purpose because of the easy precipitative separation of the formed amylose. But pullulanases of Actinomycetes e.g. Nocardia (IFO 3384), discovered by the inventors or the enzyme produced by Lactobacillus (IFO 3345), another discovery of the inventors, are also employable. The hydrolysis of starch by the heat stable enzymes of Lactobacillus and Actinomycetes is effected at 60° C., and after a decrease of viscosity the temperature is lowered to 50° C., and the enzymes obtained from microorganisms other than Lactobacillus and Actinomycetes; are added preferably. The optimum pH for the enzymes from Pseudomonas is 3.0–5.0, and the others 5.0–7.0. The reaction is completed in 30–45 hours. Following the reaction the resultant solution is cooled gradually and the macromolecular amyloses are recovered by precipitation. The low-molecular amyloses are precipitated thereafter by concentration and cooling. The precipitates obtained after removal of the supernatant are dissolved in distilled water again, and, at a concentration of about 10%, the solution is reprecipitated and refractionated. The undissolved macromolecules and reductive oligosaccharides are then removed to give a molecular distribution of D.P. 15–50. Alternatively, amyloses from which the supernatant is removed may be dissolved again with the addition of alcohol, methanol or other. Furthermore, the natural-macromolecular amyloses can be removed by centrifuge or filtration following retrogradation by cooling and freezing, then thawing the frozen amyloses.

These amploses may be further purified by dissolving again in water and precipitating with the addition of alcohol, methanol or other. Furthermore the process of removing long chain amyloses may be replaced by centrifugation or filtration of the hydrolyzed material after freezing and thawing.

The amylose thus prepared possess a limited range of D.P. distribution, 15–50, are soluble in warm-water, are highly susceptible to alpha-amylast and leave no limited dextrins. All these characters indicate that the amylose is suitable for the analysis of amylase activity.

In the following description, the detailed method for the determination of amylase activity in serum is set forth and some practical cases in medical clinic tests by using the amylose as substrate are compared with the data obtained by using starch.

Methods: Blood serum of human and rabbit, urine and duodenal fluid of rabbit served as materials. Before use, human serum was diluted 50 to 100 times with 0.85% saline solutions. Rabbit serum, urine, and duodenal fluid were diluted 100, 50 and 5,000 times, respectively. Each diluted material was added to 0.25 ml. of substrate solution, 0.25 ml. of phosphate buffer solution, pH 6.9. The mixture was kept at 37° C. for 30 minutes, then cooled in water. At room temperature 1.0 ml. of 3,5-dinitro-salicylic acid reagent was added and kept at 100° C. for 5 minutes and then cooled with water. After cooling, 2.0 ml. of water was added and the amylase activity was measured by determining the optical density (O.D., hereinafter) at 530 m$\mu$, using a photoelectric colormeter (Hitachi Model 101). The calculation of amylase activity was made by the following equation.

$$AU = K(O.D._1 - O.D._0)$$

where
AU is amylase unit
K=Constant of the instrument
$O.D._1$=Optical density of the sample at 530 m$\mu$
$O.D._0$=Value of Blank test.

Figure 2:
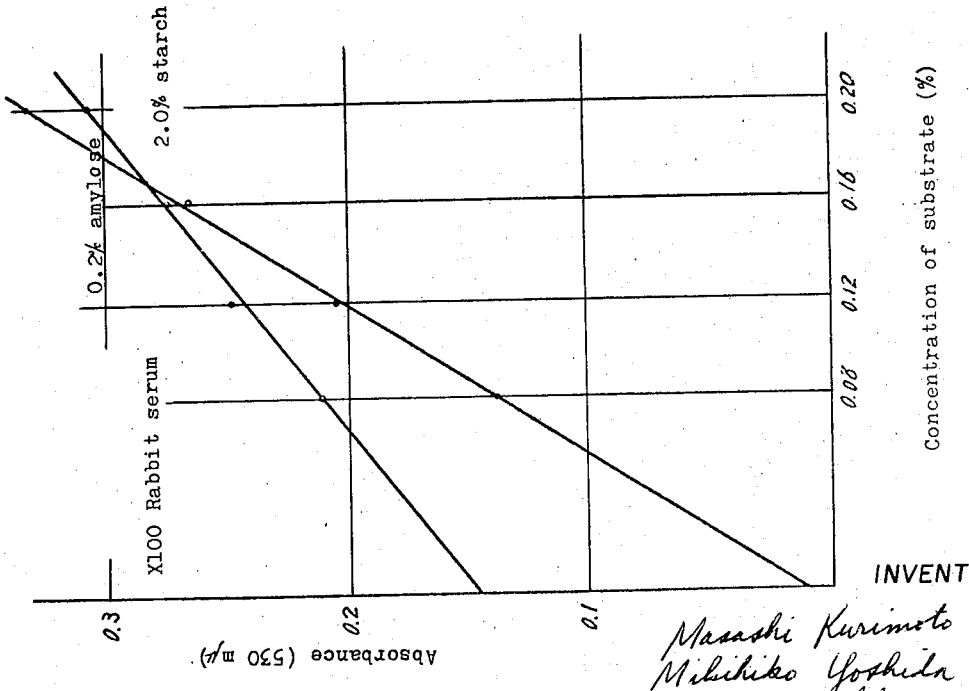

FIGS. 1 and 2 show the optical density curves obtained on determining the amylase activity present in serums of human and rabbits using starch and amylose as substrates. FIG. 3 shows the optical density curves on varying the concentrations of human serum. FIGS. 4 and 5 show the relation between the optical densities of abnormal and normal serums of human and serum concentration.

Results: The amylase activity of the serum (diluted 50 times) of a patient with a pancreatic disease was measured with substrates in varied concentration from 0.1 to 2.0%. The O.D. increased with the increase in concentration of substrates both in amylase and starch. But, at concentrations of 0.3%–2% of substrates, the O.D. of the sample containing amylose as substrate was about ten times higher than that of the sample containing starch (Table I). Thus, the reaction appears 10 times more sensitive in amylose than in starch.

TABLE I.—AMYLASE ACTIVITY OF A HUMAN SERUM SAMPLE MEASURED WITH AMYLOSE AND STARCH AS SUBSTRATES

| Substrate concentration | 0.1% | 0.2% | 0.3% | 1.0% | 2.0% |
|---|---|---|---|---|---|
| O.D. at 530 m$\mu$: | | | | | |
| Amylose | 0.089 | 0.179 | 0.443 | 0.819 | 1.644 |
| Starch | | | 0.035 | 0.059 | 0.099 |
| Amylose O.D./starch O.D. | | | ×12.7 | ×13.9 | ×16.6 |

Next, blood serum samples of human and rabbit were diluted 100 times and their amylase activities were determined by using a 2% starch solution and a 0.2% amylose solution in each sample. The results showed that the samples containing amylose gave substantially higher O.D., than those containing starch, about 10 times more (FIGS. 1 and 2).

The measurement of O.D.'s of the sample containing normal human serum at varied concentration and with 0.2% amylose and 2% starch as substrate showed a good correlation between the intensity of O.D. and the amount of serum (FIG. 3).

Observations on the O.D.'s of serum having a high amylase activity from a patient with pancreatic disease gave also similar results as in normal serum as determined by using a 0.2% amylose solution and a 2% starch solution as substrates, i.e. the O.D. decreased in proportion with the decrease in serum concentrations. The samples in which amylose was used as substrate gave a clear linear proportion between the enzymatic activity and O.D., while, in the samples containing starch the linearity was an irregular one. The results showed again the superiority of amylose as the substrate for amylase activity test (FIGS. 4 and 5).

O.D. of the samples increased with the lapse of reaction time, namely, 15, 30 and 45 minutes. The curves showing the relationship between O.D. and reaction time with 0.16%, 0.12% and 0.08% amylose solutions gave parallel straight lines indicating that the mentioned concentrations of the substrate and the reaction periods can be used for the quantitative estimation of amylase activity if the condition is restricted in each case.

Test on the hemolyzed blood showed a somewhat higher value but no direct interference of hemoglobin was found on the O.D. at 530 m$\mu$ of the sample.

Conclusion: From the results described above the following are concluded: In the amylase activity test amylose gives a good substrate at the concentration of one-tenth of that of starch.

Coloration of the amylose with 3,5-dinitrosalicylic acid is superior to that of starch and amylose gives more accurate and reliable data compared to those obtained by starch.

The O.D. of the sample to be obtained by using amylose is not inhibited by hemoglobin, so serum separated from hemolyzed blood is not necessary.

Another advantage is that amylose is highly hydrophilic and does not denature by storage, i.e. crystallization may occur but it can be used by warming where the crystals are easily dissolved. All these characteristics of amylose indicate that amylose is a superior substrate for the amylase activity test, especially useful for the clinical test of the materials from the patient.

Amylose is also employable in the iodine method for determining amylase activity. O.D. of the sample at 600 m$\mu$ is accurately proportionate with the activity of amylase and with the concentration of the blood serum, and some other biological materials, showing again that amylose is an excellent substrate for the analysis of ordinary amylases as well as for clinical tests. The following examples, without limiting in any way the scope of the invention which we claim, are specific embodiments of the invention. All portions in the examples are indicated by weight unless specified otherwise.

PREPARATION OF AMYLOSE

Example I

A 10% suspension of waxy-corn starch was heated at 150° C.–160° C. under stirring conditions for ten minutes to give a homogeneous gelatinized starch solution. The solution was cooled rapidly to 50° C., adjusted to pH 3.0–5.0, then 50 units of purified enzyme of Pseudomonas per gram starch were added. The mixture was mixed intimately by stirring, incubated at 40° C. and the small amount of precipitates thus formed was centrifuged. The centrifuged liquid was then cooled gradually to 5° C., whereupon the formed precipitates A were filtered. Thus a crude product of amylose was obtained as solid, in the yield of 82%.

Purification method 1.—1–2% solution of the precipitate A was filtered with an ultrafiltration membrane such as Amicon membrane PM 30 under pressure conditions. The filtrate was concentrated in vacuo to a concentration of 10%, cooled gradually, and the crystalline precipitates were filtered and dried at 50° C. The amylose thus obtained was easily soluble in warm-water (50° C.) and gave blue-violet color by iodine reaction. The mean polymerization degree was 26.

Purification method 2.—Said precipitate A (moisture content 85%) was frozen at −15° C., thawed at 30° C., stirred at 50° C. for 60 minutes and then the undissolved substances were devoided by centrifugation. The eluted solution was cooled gradually and then the crystallized materials were obtained through centrifugation. The precipitate was washed with cold water and then dried in vacuo. The amylose showed 25 in mean polymerization degree and 4.5% of reducing power, solubility in warm-water and gave a blue-violet color in iodine reaction.

Purification method 3.—To said precipitates A (moisture content 85%) was added water to give 5% solution. The solution was heated at 70° C. for 10 minutes under stirring and the undissolved substances were devoided by centrifugation. The supernatant was cooled gradually and the amylose was crystallized and precipitated. After standing for 10 hours at 5° C., the precipitate was filtered, washed with cold water, and then dried at 50° C. under reduced pressure. The yield of the product was 75%. The product was 25 in mean degree of polymerization and gave bluish purple color in iodine reaction, soluble in warm-water and 4.8% of reducing power.

Purification method 4.—To a 5% aqueous solution of said precipitates A was added ethanol to give a solution in volume 5%. A small amount of precipitates thus formed were removed by centrifugation and the alcohol concentration was raised to 50%. The crystals were centrifuged and dried.

Example II

A 25% aqueous suspension of potato starch was stirred vigorously to and heated at 160° C.–170° C. for 20 minutes. Cooling rapidly to 60° C., the resultant was diluted to 15% solution with water and, the enzyme of Lactobacillus was added. After mixing well, the starch was digested by the enzyme for 40 hours at 50° C. by which the viscosity of the solution was reduced, frozen at −15° C., thawed at 30° C., and kept at 55° C. for 30 minutes. The eluted portion was collected by centrifugation. The supernatant thus obtained was allowed to stand at 0° C. for 10 hours, heated to 55° C., and the eluted portion was separated from the undissolved precipitates by centrifugation. By cooling, the crystallized precipitate was obtained. These were washed with water and dried. The yield of the product was about 30%. The product was 17–52 in mean polymerization degree as determined by fractionation with Sephadex G–100. The product was water-soluble. Good reproducibilities of the value was obtained by using the product as a substrate for amylase determination according to Somogyi's method.

What we claim is:

1. In a process for the production of amylose with a polymerization degree in the range of 15–50 comprising gelatingizing a starch slurry by heating, cooling the gelatinized starch solution and hydrolyzing the cooled solution with pullulanase or isoamylase to obtain a mixture of amyloses of various polymerization degrees, gradually cooling the amylose mixture to effect precipitation of long chain amyloses of high polymerization degrees, removing the precipitated long-chain amyloses, cooling the resultant mother liquor to precipitate the shorter chain amyloses and recovering the shorter chain amyloses, the improvement wherein said shorter chain amyloses may be purified sufficiently for use as a substrate for the quantative analysis of amylase comprising the further steps of:

fractionating and purifying the recovered shorter chain amyloses until a straight chain amylose product having a degree of polymerization distribution of 15–50 is obtained which is easily soluble in water, shows a definite sensitivity against amylase activity, and contains no limited dextrin, wherein said fractionating and purifying step comprises freezing said shorter chain amylose at a temperature of about −15° C., thawing at a temperature of 30° C., agitating the fraction at a temperature of about 50° C. for about 60 minutes, removing the insoluble portion, concentrating and cooling the mother liquor until said shorter chain amylose product precipitates, recovering the precipitated amylose, and drying said recovered amylose product.

2. A process according to to claim 1 wherein waxy corn starch or glutinous rice starch is used as the starting material starch.

3. A process acording to claim 1 wherein the enzyme produced by *Pseudomonas amyloderamosa* ATCC 21216 is used as the isoamylase.

References Cited
UNITED STATES PATENTS 3,632,475   1/1972   Sugimoto et al. ----- 195—31 R

OTHER REFERENCES

Michaels: Chem. Eng. Progress, vol. 64, pp. 31–43, 1968.

A. LOUIS MONACELL, Primary Examiner

T. G. WISEMAN, Assistant Examiner